US010430803B2

(12) United States Patent
Bene et al.

(10) Patent No.: US 10,430,803 B2
(45) Date of Patent: Oct. 1, 2019

(54) METHODS AND SYSTEMS FOR PREDICTING CONSUMER BEHAVIOR FROM TRANSACTION CARD PURCHASES

(75) Inventors: Marc Del Bene, Darien, CT (US); Po Hu, Norwalk, CT (US); Anant Nambiar, Larchmont, NY (US); Daniel G. Salazar, Ridgefield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 2195 days.

(21) Appl. No.: 12/342,925

(22) Filed: Dec. 23, 2008

(65) Prior Publication Data

US 2010/0161379 A1 Jun. 24, 2010

(51) Int. Cl.
G06Q 30/02 (2012.01)
(52) U.S. Cl.
CPC ......... *G06Q 30/02* (2013.01); *G06Q 30/0202* (2013.01); *G06Q 30/0204* (2013.01)
(58) Field of Classification Search
CPC ...... G06Q 10/087; G06Q 10/06; G06Q 30/02; G06Q 30/0202; G06Q 30/0204; G06Q 30/0201
USPC ...................................................... 705/7.31
See application file for complete search history.

(56) References Cited

U.S. PATENT DOCUMENTS

| | | | |
|---|---|---|---|
| 5,974,396 A * | 10/1999 | Anderson et al. | 705/7.33 |
| 6,236,975 B1 | 5/2001 | Boe et al. | |
| 6,334,110 B1 * | 12/2001 | Walter et al. | 705/14.41 |
| 6,430,539 B1 * | 8/2002 | Lazarus et al. | 705/7.31 |
| 6,434,534 B1 | 8/2002 | Walker et al. | |
| 6,735,580 B1 * | 5/2004 | Li | G06N 3/049 706/21 |
| 6,839,682 B1 * | 1/2005 | Blume et al. | 705/7.31 |
| 6,925,441 B1 | 8/2005 | Jones, III et al. | |
| 6,996,560 B1 | 2/2006 | Choi et al. | |
| 7,035,855 B1 | 4/2006 | Kilger et al. | |
| 7,072,863 B1 | 7/2006 | Phillips et al. | |

(Continued)

OTHER PUBLICATIONS

Anil, M. et al., "Life-Changing Events and Marketing Opportunities" (Jan. 2006) Journal of Targeting, Measurement and Analysis for Marketing: vol. 14, No. 2, pp. 115-128.*

(Continued)

*Primary Examiner* — Tiphany B Dickerson
(74) *Attorney, Agent, or Firm* — Armstrong Teasdale LLP

(57) ABSTRACT

A computer-based method for predicting consumer behavior is provided. The method is performed using a computer system coupled to a database. The method includes recording consumer data in the database for each consumer of a global population of consumers including historical purchases made by each consumer using a transaction card, defining a life event by assigning spending variables to the life event, determining a sample group of consumers that are experiencing the life event based on the consumer data stored within the database with respect to the spending variables, generating a predictive model based on historical purchases made by consumers within the sample group, and applying the predictive model to predict each consumer within the global population that will experience the life event. The predictive model is applied using the computer system. A list of consumers predicted to experience the life event within a predetermined time period is output.

22 Claims, 8 Drawing Sheets

(56) References Cited

U.S. PATENT DOCUMENTS

| | | |
|---|---|---|
| 7,165,037 B2 | 1/2007 | Lazarus et al. |
| 7,212,979 B1 | 5/2007 | Matz et al. |
| 7,233,913 B2 | 6/2007 | Scroggie et al. |
| 7,305,364 B2 | 12/2007 | Nabe et al. |
| 7,319,972 B2 * | 1/2008 | von Gonten et al. ....... 705/7.29 |
| 7,392,221 B2 | 6/2008 | Nabe et al. |
| 7,398,226 B2 | 7/2008 | Haines et al. |
| 7,398,248 B2 | 7/2008 | Phillips et al. |
| 7,424,439 B1 | 9/2008 | Fayyad et al. |
| 7,680,685 B2 * | 3/2010 | Ouimet et al. ............... 705/7.31 |
| 2002/0010620 A1 * | 1/2002 | Kowalchuk et al. ........... 705/10 |
| 2002/0010668 A1 * | 1/2002 | Travis et al. .................. 705/35 |
| 2003/0200135 A1 | 10/2003 | Wright |
| 2004/0111347 A1 * | 6/2004 | Kauffman et al. .............. 705/36 |
| 2005/0288990 A1 * | 12/2005 | Ballou et al. .................. 705/10 |
| 2006/0122857 A1 * | 6/2006 | DeCotiis et al. ................. 705/1 |
| 2006/0143075 A1 | 6/2006 | Carr et al. |
| 2006/0413071 | 6/2006 | Hofmann |
| 2007/0067206 A1 | 3/2007 | Haggerty et al. |
| 2007/0078869 A1 * | 4/2007 | Carr ....................... G06Q 30/02 |
| 2007/0192167 A1 * | 8/2007 | Lei ....................... G06Q 20/227 |
| | | 705/7.31 |
| 2008/0033816 A1 * | 2/2008 | Miller et al. .................... 705/14 |
| 2008/0077487 A1 * | 3/2008 | Davis et al. .................... 705/14 |
| 2008/0082386 A1 * | 4/2008 | Cunningham et al. ........... 705/8 |
| 2008/0086365 A1 | 4/2008 | Zollino et al. |
| 2008/0133325 A1 * | 6/2008 | De et al. ......................... 705/10 |
| 2008/0221970 A1 | 9/2008 | Megdal et al. |
| 2008/0221972 A1 | 9/2008 | Megdal et al. |
| 2008/0228556 A1 | 9/2008 | Megdal et al. |
| 2008/0243531 A1 * | 10/2008 | Hyder et al. ..................... 705/1 |

OTHER PUBLICATIONS

Andreasen, A., "Life Status Changes and Changes in Consumer Preferences and Satisfaction" (Dec. 1984) Journal of Consumer Research: vol. 11, No. 3, pp. 784-794.*

Hoerle, Roger W., "Statistics Roundtable: The Reality of Residual Analysis" (Jun. 2008), accessed at: http://asq.org/quality-progress/2008/06/statistics-roundtable/the-reality-of-residual-analysis.html (4 pages).*

* cited by examiner

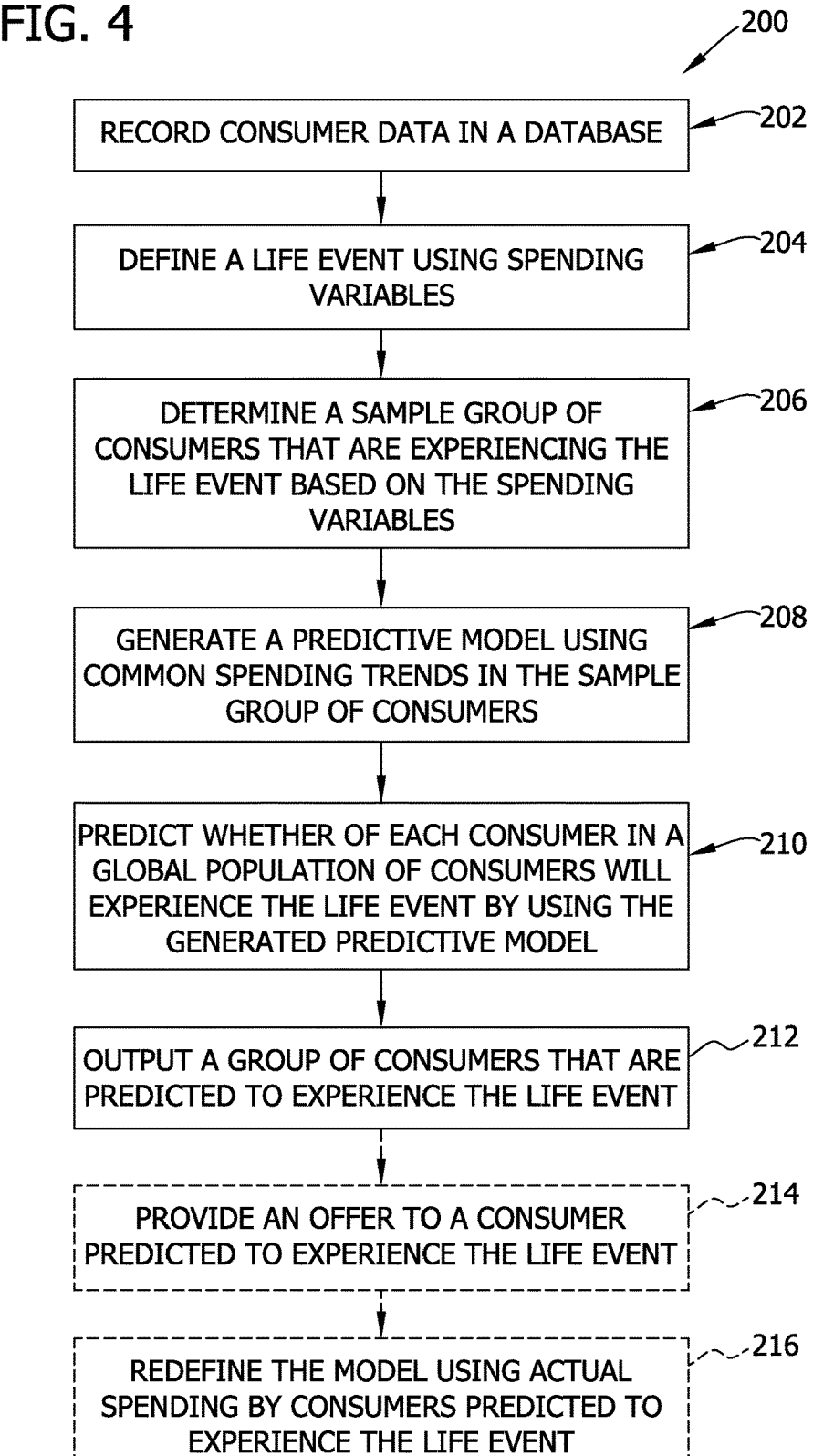

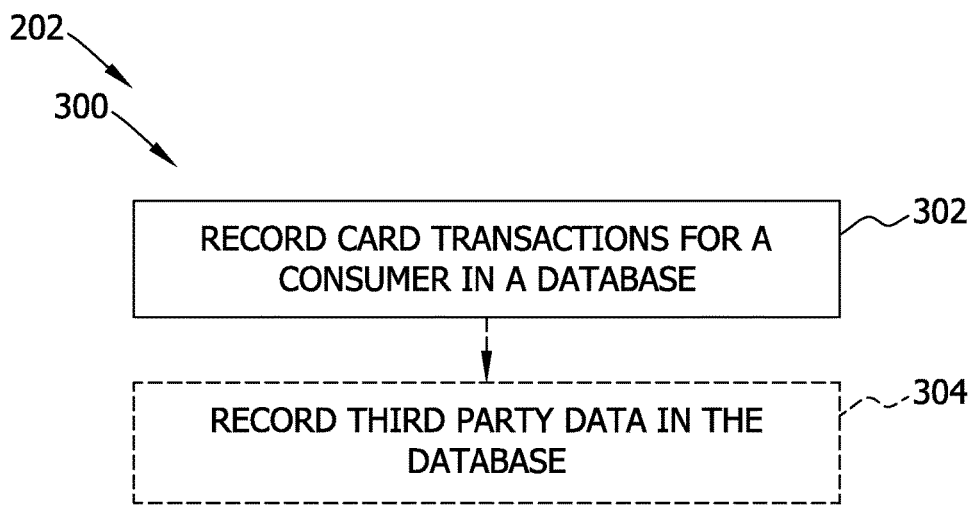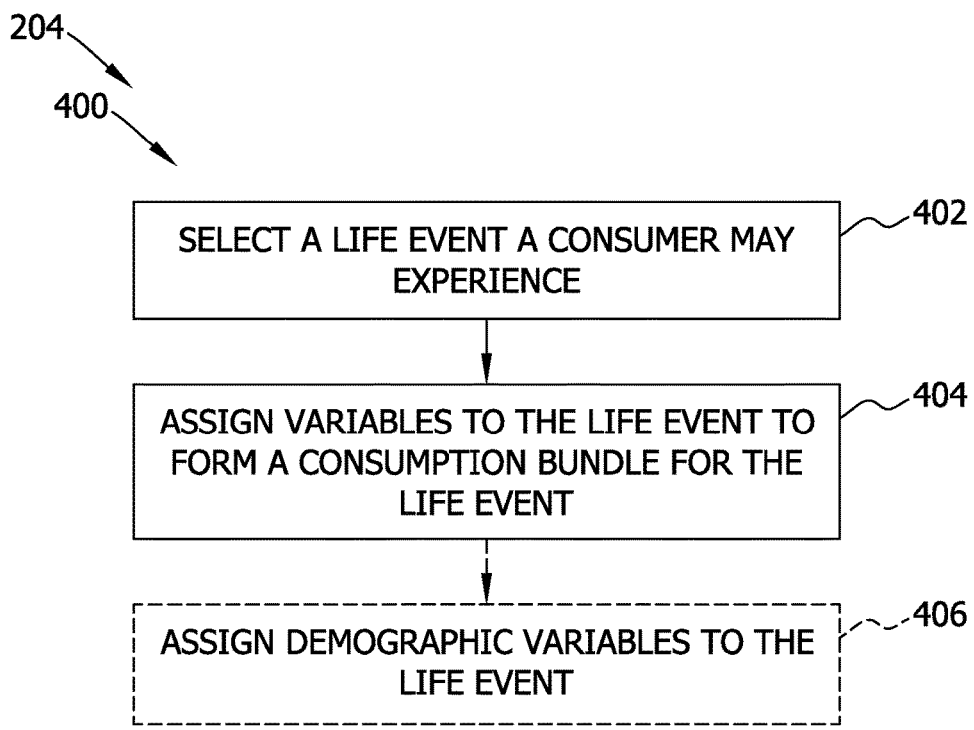

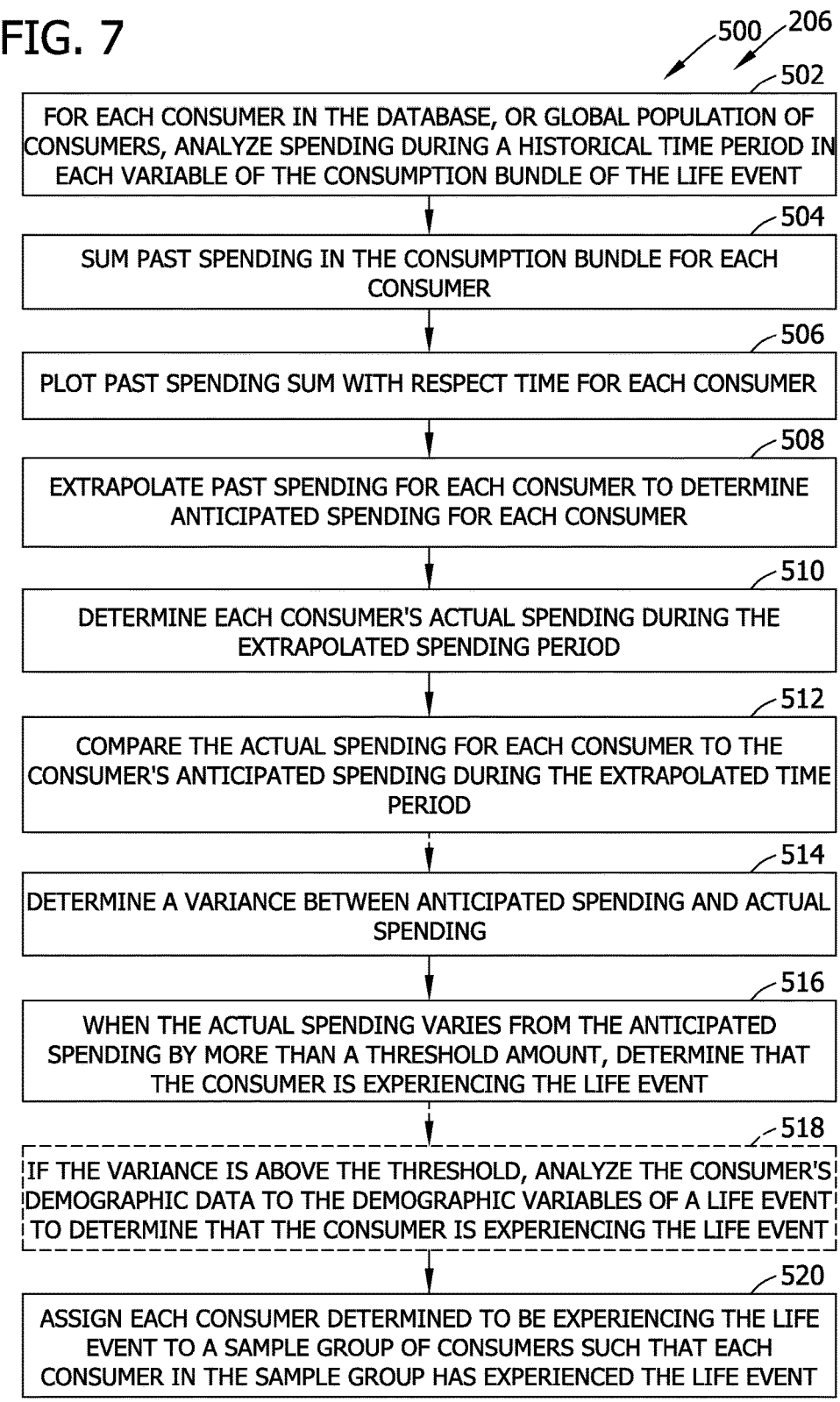

METHODS AND SYSTEMS FOR PREDICTING CONSUMER BEHAVIOR FROM TRANSACTION CARD PURCHASES

BACKGROUND OF THE INVENTION

The field of the invention relates generally to predicting consumer behavior from transaction card purchases and, more particularly, to network-based methods and systems for predicting whether a consumer will experience a life event, and predicting future purchases of the consumer based on the predicted life event.

Historically, the use of "charge" or transaction cards or payment cards for consumer transaction payments was at most regional and based on relationships between local credit or debit card issuing banks and various local merchants. The transaction card industry has since evolved with the issuing banks forming associations or networks (e.g., MasterCard®) and involving third party transaction processing companies (e.g., "Merchant Acquirers") to enable cardholders to widely use transaction cards at any merchant's establishment, regardless of the merchant's banking relationship with the card issuer. (MasterCard is a registered trademark of MasterCard International Incorporated located in Purchase, N.Y.).

For example, FIG. 1 shows an exemplary multi-party payment card industry system for enabling payment-by-card transactions in which the merchants and issuer do not need to have a one-to-one special relationship. Yet, various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others.

Further, many merchants spend large amounts of money on marketing. Because marketing to a large general audience may be expensive, it may be advantageous to determine consumer interest in advance and attempt to target marketing toward consumers who are more likely to be interested in the product or products that a particular merchant sells. In this way merchants may attempt to better utilize their marketing budget to improve sales. In addition, consumers will be less likely to receive irrelevant or uninteresting offers.

At least some known systems and methods for determining consumer interest have relied on demographic information, such as age, income, and/or occupation. However, a consumer's needs may change quickly based on the consumer's current circumstances and/or the consumer's knowledge of future circumstances. For example, a consumer may decide to purchase a house in the near future. As such, the circumstances driving the consumer's decision to purchase the house may change faster than the ability of any of the known systems to determine such a change in demographic information. In other words, the demographic data of the consumer may change resulting in many purchases by the consumer, but by the time the change is detected by the known systems, the consumer has already made many of the purchases. In these cases, many of these purchases are then missed by the marketer.

In some other cases, there may be little or no change in demographic data although circumstances surrounding the consumer have changed and, accordingly, the consumer's needs have changed. For example, it may be more likely that a consumer who is planning to buy a house will need a mortgage and/or new furniture. As such, even though the consumer's demographic data, such as age, income, and/or occupation, may have remained constant, it is probable that the consumer will take out a mortgage and/or buy new furniture in the near future because of an impending home purchase.

However, in some cases, demographic data does help to predict some purchases. For example, if a person's job includes frequent relocation, that person may be a frequent home purchaser. Based on the demographic data alone, it may be possible to predict that the person is likely to buy a home.

At least some known targeting models have been known to achieve lifts of 1.3 times to 1.6 times on large populations. As used herein, the term "lift" refers to a ratio of positive responses to an offer by a consumer included within a target subgroup as compared to positive responses to the same offer made to the population as a whole. The target subgroup is usually selected to include those members of the whole population that are more likely to respond. It may, however, be difficult to determine the demographic information. This may be especially likely when changes have recently occurred in the person's demographic data.

Additionally, even when correct demographic information is known, it may be difficult to determine when a purchase, such as a home purchase, will actually occur. Timing is important in advertising and/or marketing because an unneeded advertisement and/or coupon might be thrown away, thus, wasting marketing money spent by the merchant. In one example, a discounted mortgage offer from bank X might be discarded by a consumer this month, while a discounted mortgage offer from bank Y might be used by the consumer next month because it is received near the time of a home purchase. As such, if bank Y is better at predicting when a mortgage is needed by a consumer, bank Y may be able to get more business than bank X. Further, the resources of bank X may be wasted by sending mortgage offers to consumers not planning on buying a new home, and the consumers may ignore possibly relevant offers after receiving many irrelevant offers. As such, matching offers to a consumer or a specific group of consumers in a timely fashion may be beneficial for the parties involved.

Accordingly, it is desirable to have the ability to identify indicators and/or signals that suggest a change in a consumer's needs or behaviors. By determining a consumer's changing needs and behaviors more accurately a merchant may, for example, be able to better predict what promotion, offers, and/or coupons to send to a consumer, and when these promotions, offers, and/or coupons should be sent to the consumer.

BRIEF DESCRIPTION OF THE INVENTION

In one aspect, a computer-based method for predicting consumer behavior is provided. The method is performed using a computer system coupled to a database. The method includes recording consumer data in the database for each consumer of a global population of consumers including historical purchases made by each consumer using a transaction card, defining a life event by assigning spending variables to the life event, determining a sample group of consumers that are experiencing the life event based on the consumer data stored within the database with respect to the spending variables, generating a predictive model based on historical purchases made by consumers within the sample group, and applying the predictive model to predict each consumer within the global population that will experience the life event. The predictive model is applied using the computer system. A list of consumers predicted to experience the life event within a predetermined time period is output.

In another aspect, a computer for predicting behavior of a consumer based on the consumer's purchases made using a transaction card is provided. The computer is coupled to a database. The computer is configured to record consumer data in the database for each consumer of a global population of consumers including historical purchases made by each consumer using a transaction card, define a life event by assigning spending variables to the life event, determine a sample group of consumers that are experiencing the life event based on the consumer data stored within the database with respect to the spending variables, generate a predictive model based on historical purchases made by consumers within the sample group, apply the predictive model to predict each consumer within the global population that will experience the life event, and output a list of consumers predicted to experience the life event within a predetermined time period.

In still another aspect, a network based system for predicting behavior of a consumer based on the consumer's purchases made using a transaction card is provided. The system includes a client system, a centralized database for storing information, and a server system configured to be coupled to the client system and the database. The server system is configured to record consumer data in the centralized database for each consumer of a global population of consumers including historical purchases made by each consumer using a transaction card, define a life event by assigning spending variables to the life event, determine a sample group of consumers that are experiencing the life event based on the consumer data stored within said database with respect to the spending variables, generate a predictive model based on historical purchases made by consumers within the sample group, apply the predictive model to predict each consumer within the global population that will experience the life event, and output a list of consumers predicted to experience the life event within a predetermined time period.

In still another aspect, a computer program embodied on a computer readable medium for predicting consumer behavior is provided. The program includes at least one code segment that records consumer data in the database for each consumer of a global population of consumers including historical purchases made by each consumer using a transaction card, defines a life event by assigning spending variables to the life event, determines a sample group of consumers that are experiencing the life event based on the consumer data stored within the database with respect to the spending variables, generates a predictive model based on historical purchases made by consumers within the sample group, applies the predictive model to predict each consumer within the global population that will experience the life event, and outputs a list of consumers predicted to experience the life event within a predetermined time period.

The embodiments described herein facilitate achieving higher lifts as compared to other known targeting methods and system. For example, the embodiments described herein achieve lifts of approximately 2.4 times to approximately 4.3 times, as compared to the lifts of 1.3 times to 1.6 times for known targeting methods for a large population. In other words, the methods and systems described herein provide better accuracy in predicting future purchases of a consumer.

BRIEF DESCRIPTION OF THE DRAWINGS

FIG. 4 is a flowchart illustrating an exemplary method utilized by the system shown in FIG. 2 for predicting a consumer's behavior.

FIG. 5 is a flowchart illustrating an exemplary method for recording consumer data in a database that may be used with the method shown in FIG. 4.

FIG. 6 is a flowchart illustrating an exemplary method for defining a life event that may be used with the method shown in FIG. 4.

FIG. 7 is a flowchart illustrating an exemplary method for determining a sample group of consumers that may be used with the method shown in FIG. 4.

DETAILED DESCRIPTION OF THE INVENTION

Figure 1:
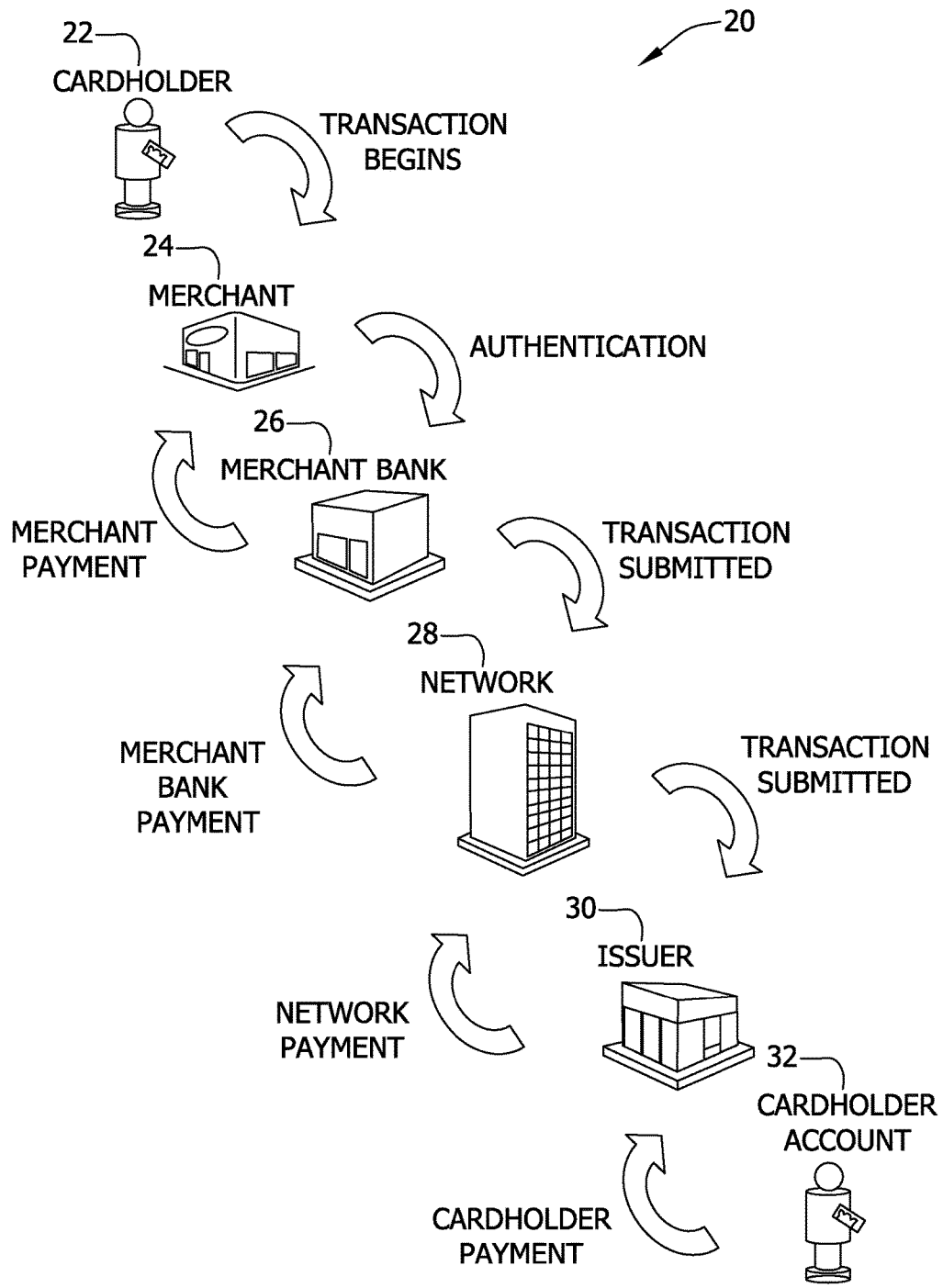
FIG. 1 is a schematic diagram illustrating an exemplary multi-party payment card industry system for enabling ordinary payment-by-card transactions in which the merchants and issuer do not need to have a one-to-one special relationship.

The embodiments described herein are directed to systems and methods for predicting consumer behavior based on the consumer's purchases using transaction cards, such as a credit card, debit card, membership cards, promotional cards, frequent flyer cards, identification cards, prepaid cards, gift cards, and/or any other devices that may hold payment account information, such as mobile phones, personal digital assistants (PDAs), and key fobs. Such cards and/or devices are referred to herein as "a transaction card" or "transaction cards." These cards can all be used as a method of payment for performing a transaction. For example, a transaction card franchiser, transaction card provider, bank, and/or credit union may capture and store purchasing data for account holders. The purchasing data for each transaction may include an account number, a merchant identification, a transaction amount, a transaction date, and/or any other suitable information related to the transaction.

In the exemplary embodiment, consumer behavior is predicted using, for example, a transaction date, a transaction amount, and a spending variable designation for purchases made using a transaction card. The transaction date, as referred to herein, may be the purchase date, the posting date, and/or any date associated with the transaction. The same type of date, such as the purchase date or the posting date, can be for all transactions. Alternatively, different types of dates can be used for different transactions. As such, in the alternative embodiment, any date available and associated with a transaction can be used, even if purchase dates and posting dates are mixed together in the same data set. By using transaction data, such as the date and the amount, the transaction card provider can identify consumer spending behaviors and enable merchants to design offers and targeted marketing campaigns.

The consumer behavior modeling systems and methods described herein are based on an historical spending behavior of each consumer to predict whether a consumer will experience a predefined life event (e.g., purchasing a new home, having a new baby, and sending a child to college), and thus, predict the future spending habits of each consumer that is predicted to experience such a life event. The example embodiment includes defining a plurality of life events that a consumer may experience. Each life event includes a consumption bundle or spending variables. Each consumption bundle includes different services or products that a consumer purchases using a transaction card when that consumer is experiencing a particular life event. The example embodiment, therefore, determines whether the spending habits of a consumer changes or varies by a predetermined amount within a consumption bundle. If, for example, a consumer purchases more of a certain product included within a consumption bundle (or spending variables) as compared to that consumer's past purchasing data, then that consumer may be experiencing the life event assigned to that consumption bundle. Such information can then be used to identify other consumers that will also experience the same life event, and predict those consumers that will increase spending within the consumption bundle.

More specifically, the systems and processes described herein enable a user to predict whether a consumer will experience a life event, and then predict future purchases of the consumer based on the predicted life event. A technical effect of the systems and processes described herein include at least one of (a) recording consumer data in a database for each consumer having made a purchase using a transaction card including a transaction date and a transaction amount, wherein the consumer is included within a global population of consumers; (b) defining a life event by assigning spending variables to the life event, wherein the life event may include such happenings as purchasing a new home, having a new baby, and sending a child to college; (c) for each consumer stored within the database, predicting an amount the consumer will spend on products or services included within the spending variables assigned to the life event for a predetermined period of time in the future, wherein the spend prediction is based on consumer data stored within the database; (d) calculating a variance for each consumer stored within the database, the variance comprising a difference between an actual amount spent by the consumer on products or services included within the spending variables assigned to the life event for the predetermined period of time in the future and the predicted amount; (e) identifying the consumers having a positive variance as consumers experiencing the life event and including the identified consumers in a sample consumer group; (f) analyzing consumer data for each consumer included within the sample consumer group; (g) generating a predictive model based on the consumer data analysis, wherein the predictive model uses consumer data to predict whether a corresponding consumer will experience the life event; (h) applying the predictive model to all consumers stored within the database; and (i) outputting a list of consumers satisfying the predictive model, wherein the outputted list of consumers includes each consumer that will experience the life event within a predetermined period of time. By determining the consumers that will experience the life event and by assigning the spending variables to the life event, a user can then predict an increase in spending by these consumers in the spending variable assigned to the life event. This system and method can be used for a plurality of life events, wherein each life event has certain spending variable assigned thereto.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T, New York, N.Y.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a schematic diagram 20 illustrating an exemplary multi-party payment card industry system for enabling ordinary payment-by-card transactions in which the merchants 24 and issuer 30 do not need to have a one-to-one special relationship. The present invention relates to a payment card system, such as a credit card payment system using the MasterCard® interchange network. The MasterCard® interchange network is a set of proprietary communications standards promulgated by MasterCard International Incorporated® for the exchange of financial transaction data and settlement funds between financial institutions that are members of MasterCard International Incorporated®. (MasterCard International Incorporated is a registered trademark of MasterCard International Incorporated located in Purchase, N.Y.).

In a typical payment card system, a financial institution called the "issuer" issues a payment card, such as a credit card, to a consumer 22, who uses the card to tender payment for a purchase from a merchant 24. To accept payment with the card, the merchant 24 must normally establish an account with a financial institution that is part of the financial payment system. This financial institution is usually called the "merchant bank" or the "acquiring bank" or "acquirer bank." When a consumer 22 tenders payment for a purchase with a card, the merchant 24 requests authorization from the merchant bank 26 for the amount of the purchase. The request may be performed over the telephone, but is usually performed through the use of a point-of-sale terminal, which reads the consumer's account information from the magnetic stripe or chip on the card and communicates electronically with the transaction processing computers of the merchant bank 26. Alternatively, a merchant bank 26 may authorize a third party to perform transaction processing on its behalf. In this case, the point-of-sale terminal will be configured to communicate with the third party. Such a third party is usually called a "merchant processor" or an "acquiring processor" or a "third party processor."

Using the interchange network 28, the computers of the merchant bank 26 or the merchant processor will communicate with the computers of the issuer bank 30 to determine whether the consumer's account 32 is in good standing and whether the purchase is covered by the consumer's available credit line. Based on these determinations, the request for authorization will be declined or accepted. If the request is accepted, an authorization code is issued to the merchant 24.

When a request for authorization is accepted, the available credit line of consumer's account 32 is decreased. Normally, a charge for a credit transaction is not posted immediately to a consumer's account 32 because bankcard associations, such as MasterCard International Incorporated®, have promulgated rules that do not allow a merchant 24 to charge, or "capture," a transaction until goods are shipped or services are delivered. However, with respect to at least some debit card transactions, a charge may be posted at the time of the transaction. When a merchant 24 ships or delivers the goods or services, the merchant 24 captures the transaction by, for example, appropriate data entry procedures on the point-of-sale terminal. This may include bundling of approved transactions daily for standard retail purchases. If a consumer 22 cancels a transaction before it is captured, a "void" is generated. If a consumer 22 returns goods after the transaction has been captured, a "credit" is generated.

After a transaction is captured, the transaction is settled between the merchant 24, the merchant bank 26, and the issuer 30. Settlement refers to the transfer of financial data or funds between the merchant's account, the merchant bank 26, and the issuer 30 related to the transaction. Usually, transactions are captured and accumulated into a "batch," which are settled as a group. More specifically, a transaction is typically settled between the issuer 30 and the interchange network 28, and then between the interchange network 28 and the merchant bank 26 (also known as the acquirer bank), and then between the merchant bank 26 and the merchant 24.

Figure 2:
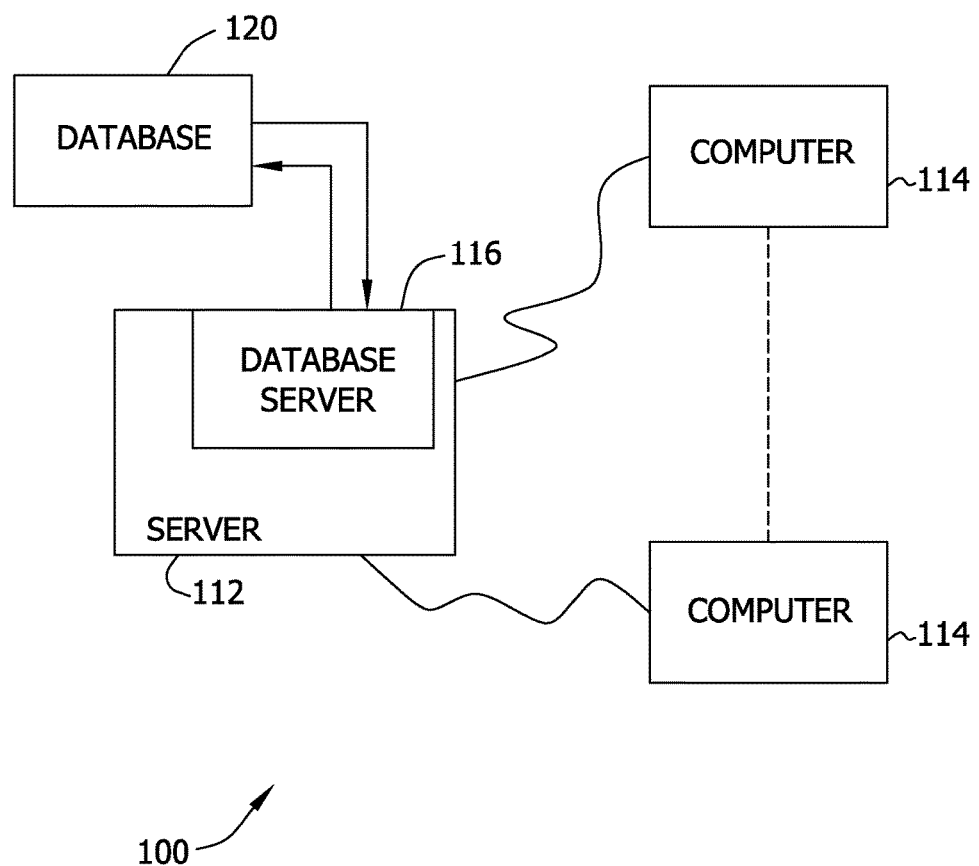
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is a payment card system used for predicting consumer behavior, and is operable to implement the modeling techniques and transaction database described herein. In addition, system 100 is operable as a payment card system, which can be utilized by users for management of accounts and payment transactions.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail.

In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 stores transaction data generated as part of sales activities conducted over the bankcard network including data relating to merchants, account holders or customers, and purchases. Database 120 may also be utilized to store survey results and results of the modeling processes described herein.

Figure 3:
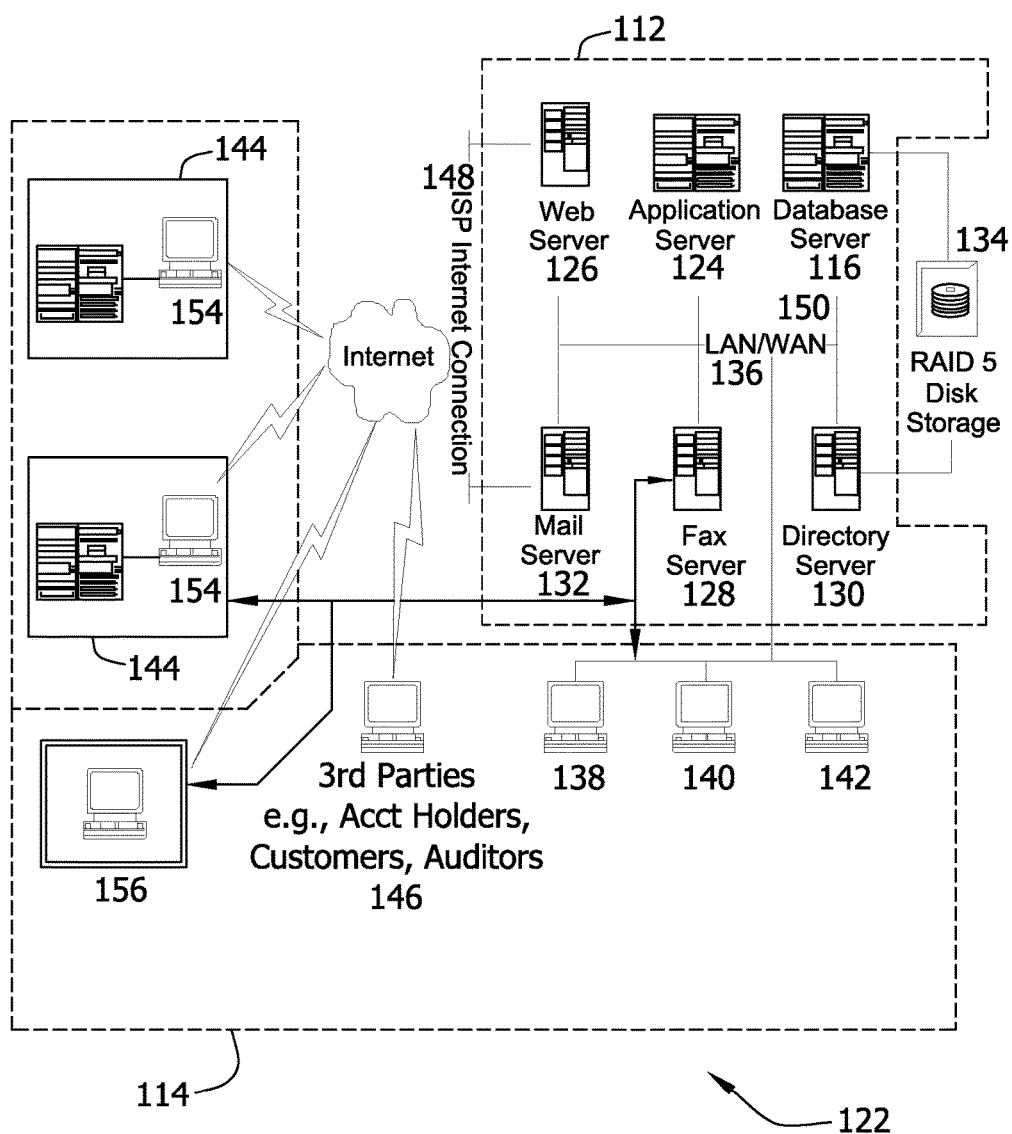
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

FIG. 4 shows a flowchart illustrating an exemplary method 200 for predicting a consumer's behavior. Method 200 is performed using system 100 (shown in FIG. 2) and/or system 122 (shown in FIG. 3). Method 200 includes recording 202 consumer data in a database, such as database 120, and defining 204 a life event using at least one spending variable. As used herein, the term "life event" refers to an event experienced by a consumer during his/her life time. Examples of a life event include, but are not limited to including, purchasing a new home, having a new baby, sending a child to college, starting a business, marriage, a promotion, retirement, getting a new job, graduating, receiving an inheritance, starting post-grad education, having new grandchildren, getting divorce, purchasing a car, and/or experiencing a medical event.

Further, as used herein, the term "spending variable" refers to spending at a type of merchant and/or on a type of good or service. Examples of spending variables include, but are not limited to including, spending at the following types of merchants and/or on the following types of goods and/or services: maternity, child/baby goods/services, toys, home goods/services, education, travel, financial instruments, office supplies, electronics, vehicles, books/media, home repair/remodeling, clothing, appliances, grocery, restaurants, phone/utility bills, and/or sub-categories of the above-listed types. The spending variable for kid/baby goods/services includes, for example, spending at child/baby stores, spending on a babysitter/nanny, purchases of child/baby clothing, and/or purchases of baby food, diapers, bottles, etc. A plurality of spending variables are defined within system 100 and/or 122, however, in the exemplary embodiment, a sub-set of all spending variables are used to define 204 a life event.

After data is recorded 202 and at least one life event is defined 204, method 200 includes determining 206 a sample group of consumers that are experiencing the defined life event, as described in more detail below. The sample group is used to generate 208 a predictive model using spending trends that are common to consumers within the sample group. The predictive model is used to predict 210 which consumers in a global population of consumers will experience the life event. Such consumers are referred to herein as "predicted consumers." Further, as used herein, the term "global population" refers to all consumers having an account on the interchange network 28. In an alternative embodiment, the term "global population" refers to a selected set of all the consumer accounts on the interchange network 28. For example, the selected set of accounts includes accounts having at least a predetermined number of purchases per month and that have been open for at least a predetermined time period. Moreover, the term "spending trends" as used herein refers to an increase, a decrease, or no change in the amount of spending in a spending variable, whether or not used to define 204 the life event, over a predetermined time period. Examples of spending trends include, without limitation, decreased spending at restaurants for the past six months, a purchase of a new home, and/or trading in an older car on a newer car. Steps 202, 204, 206, and 208 are described in more detail below.

In the exemplary embodiment, by predicting 210 which consumers in the global population will experience the life event, the spending behavior of such predicted consumers can be predicted. For example, predicted behaviors of the predicted consumers for the life event of having a new baby include spending more on baby supplies and/or maternity clothing, buying a family car, starting a college savings plan, and/or spending less on dining out and/or travel. The step of predicting 210 consumers is described in more detail below. A list, table, file, and/or other suitable compilation of the predicted consumers are then output 212 to, for example, and referring to FIGS. 2 and 3, server system 112, client system 114, database server 116, disk storage unit 134, workstation(s) 138, 140, 142, 154, and/or 156, a printer, a removable storage device, and/or to any other suitable location. In one embodiment, the output compilation of consumers can be used by the interchange network 28, issuer bank 30, and/or a merchant 24 to provide 214 an offer to a predicted consumer.

More specifically, in the exemplary embodiment, to provide 214 offers, anticipated consumer needs are mapped to offers based on the predicted change in needs and/or behaviors. Such mapping is used to recommend products to consumers predicted to experience the life event. For example, the list of predicted consumers can be offered value propositions from the interchange network 28. Further, the list of predicted consumers may be used for cross-selling products and/or services, such as, without limitation, banking (checking, savings, money market/CDs), lines and loans (mortgages/home equity, personal, student, small business), investing, planning (retirement, tax, education), and/or insurance. Additionally, a communication channel may be used to communicate a recommended promotion to the participating banks and/or directly to a predicted consumer. The communication channel can be any suitable communication channel, such as, without limitation, e-mail, mail, the internet, and/or in-person. In some embodiments, when timing may be important, offers, coupons, and/or promotions are provided with the consumer's transaction card monthly statement. In other embodiments, when timing is important, offers, coupons and/or promotions are sent to the consumer using an e-mail address associated with the card.

In one embodiment, when the predictive model determines that a consumer is or will experience the life event, the consumer be provided 214 with offers and/or promotions related to the life event. More specifically, the system 100 and/or 122 transmits information related to the predicted consumers and the life event to a bank and/or merchant, such that bank and/or merchant can provide 214 an offer, a suggestion, and/or promotion to a predicted consumer. Further, the bank and/or merchant can transmit available offers and/or promotions to the database 120 such that system 100 and/or 122 can match an offer and/or promotion to a predicted consumer based on the life event. In an alternative embodiment, the predicted model suggests products and/or promotions that are likely to appeal to a predicted customer based on the predicted change in needs or behavior associated with the life event. For example, if the predictive model predicts, based on a customer's historical spending, that a customer may be pregnant or have a pregnant spouse, it may be likely that promotions for baby related products may appeal to the customer.

Further, future actual spending of the predicted consumers can optionally be monitor and/or analyzed to refine 216 the predictive model by adding, verifying, or removing spending trends from the predictive model. More specifically, when a predicted consumer accepts or rejects an offer and/or promotion, data is transmitted to a bank, a merchant, and/or the interchange network indicating the acceptance or rejection by the consumer. For example, when the predicted consumer uses the card to accept the offer and/or promotion by making a purchase using the card, data is fed back to the predictive model such that the predictive model can be refined 216. Feedback on offer uptake can be provided to the predictive model by the bank, merchant, and/or consumer.

When the predicted consumer is experiencing the life event as predicted by the predictive model, the predictive model is verified and/or modified. In one embodiment, actual spending trends of predicted consumers accepting offers are used to add, verify, or remove spending trends within the predictive model. More specifically, by analyzing actual spending of consumers predicted to experience the life event, spending variables defining the life event can be added, verified, or removed from a consumption bundle.

Further, as predicted consumers begin to experience the life event, the consumers will be added to the sample group, as described in more detail below. As such, the predicted consumers will become the consumers used to generate 208 the predictive model. As actual spending by a consumer in the sample group achieves a new average spending profile, the consumer will be removed from the sample group. More specifically, a variance, as described in more detail below, for at least some consumers within the sample group reduces, and such consumers are removed from the sample group. As such, as consumers start exhibiting different spending trends before experiencing a life event, the predictive model is refined 216 to reflect such changes in spending behaviors. Accordingly, the predictive model gains or removes spending trends as actual consumer spending changes.

Moreover, by analyzing a group of the predicted consumers for whether predicted consumers exhibit the variance, the accuracy of the predictive model can be verified and/or refined 216. More specifically, the variance indicates that the life event is occurring. As such, predicted consumers that exhibit a variance verify that the predictive model was accurate for those consumers. Historical spending of such consumers can be analyzed to determine additional spending trends for inclusion in the predictive model. Predicted consumers that do not exhibit a variance can be used to refine 216 the predictive model to exclude such consumers from being predicted in the future.

FIG. 5 is a flowchart illustrating an exemplary method 300 for recording 202 consumer data in a database that may be used with method 200 (shown in FIG. 4). Method 300 includes recording 302 card transaction data for each card purchase made by each consumer having an account in the interchange network 28. Method 300 optionally includes recording 304 third party data about a consumer having an account in the network 28. Card transaction data and/or third party data are recorded 302 and/or 304 in database 120 (shown in FIG. 2). Cards transaction data includes, but is not limited to including, merchant name/type, transaction time, transaction date, such as a purchase date or a post date, and/or the amount spent. In one embodiment, the transaction date, transaction amount, and spending variable designation for a purchase are recorded 302. Card transaction data can be signals derived directly from transaction data captured at a point of sale device and/or other suitable device and recorded 302 to the database 120. Captured card transaction data may, when necessary, be converted into numerical form.

More specifically, the captured data can be in numerical form and/or any other suitable form. Examples of numerical form data include, without limitation, the amount of a transaction, a date of a transaction, and/or any other number or series of numbers. An example of non-numerical data includes, without limitation, categorical data, such as an identity of the merchant, a location of the merchant, a type of item purchased, a description of the item purchased, retail category, retail industry, and/or any other suitable data. When the captured data is not in numeric form, the data may need to be converted into numerical form. For example, different merchants and/or different types of merchants may be designated by a merchant number and/or a numeric merchant type designation. As such, the merchant and/or the merchant type may be processed using the systems and methods described herein.

Optionally, additional data provided by at least one third party, such as a bank, merchant, consumer, and/or other third party, is also recorded 304 in database 120. For example, demographic information and/or potentially psychographic data, such as age, occupation, education, income, gender, home address, and/or other demographic data, is recorded 304 in the database 120.

FIG. 6 is a flowchart illustrating an exemplary method 400 for defining 204 a life event that may be used with method 200 (shown in FIG. 4). Method 400 includes selecting 402 a life event a consumer may experience, such as "new baby," "child to college," or "new home." For the selected life event, at least one spending variable is assigned 404 to the life event to form a consumption bundle for the life event. The spending variables assigned 404 to the life event include categories of spending that are related to the life event. In one embodiment, the spending variables assigned 404 to the life event are intuitively selected. In an alternative embodiment, the spending variables assigned 404 to the life event are empirically selected.

In the exemplary embodiment, spending variables are selected to be in a consumption bundle such that the consumption bundle substantially proxies the selected life event. More specifically, a consumption bundle is a group of spending variables, such as merchants and/or merchant categories, associated with the onset of a life-event. For example, a consumption bundle for new baby includes merchants that sell maternity clothes and baby products.

In one embodiment, in which spending variables are assigned 404 empirically to the life event, merchants and/or industries are recursively grouped by lift by: (1) from any starting seed industry, industry A (e.g. industry A=maternity clothes); (2) find a second industry B which is mostly purchased together with industry A (e.g. industry B=toys); and (3) group industries A and B together as the new seed and repeat steps 1 and 2 until a lower lift threshold (e.g., a maximum number of industries) is reached. A conservative definition of a target life event is used to minimize classification error or false target error. More specifically, a consumption bundle is limited to those cases most likely to be indicative of the target life event. The construction of a consumption bundle associated with a life event is unique to each life event being modeled.

Optionally, at least one demographic variable is assigned 406 to the life event. As used herein, the term "demographic variable" refers to a value for a demographic category, such as age, occupation, education, income, gender, home address, and/or other demographic characteristic. For example, the life event "new bay" may be refined to "new child" or "new grandchild" by assigning 406 an age variable to the life event. In the exemplary embodiment, more than one life event can be defined 204 by assigning 404 and/or 406 respective variables to each of a plurality of life events.

Figure 8:
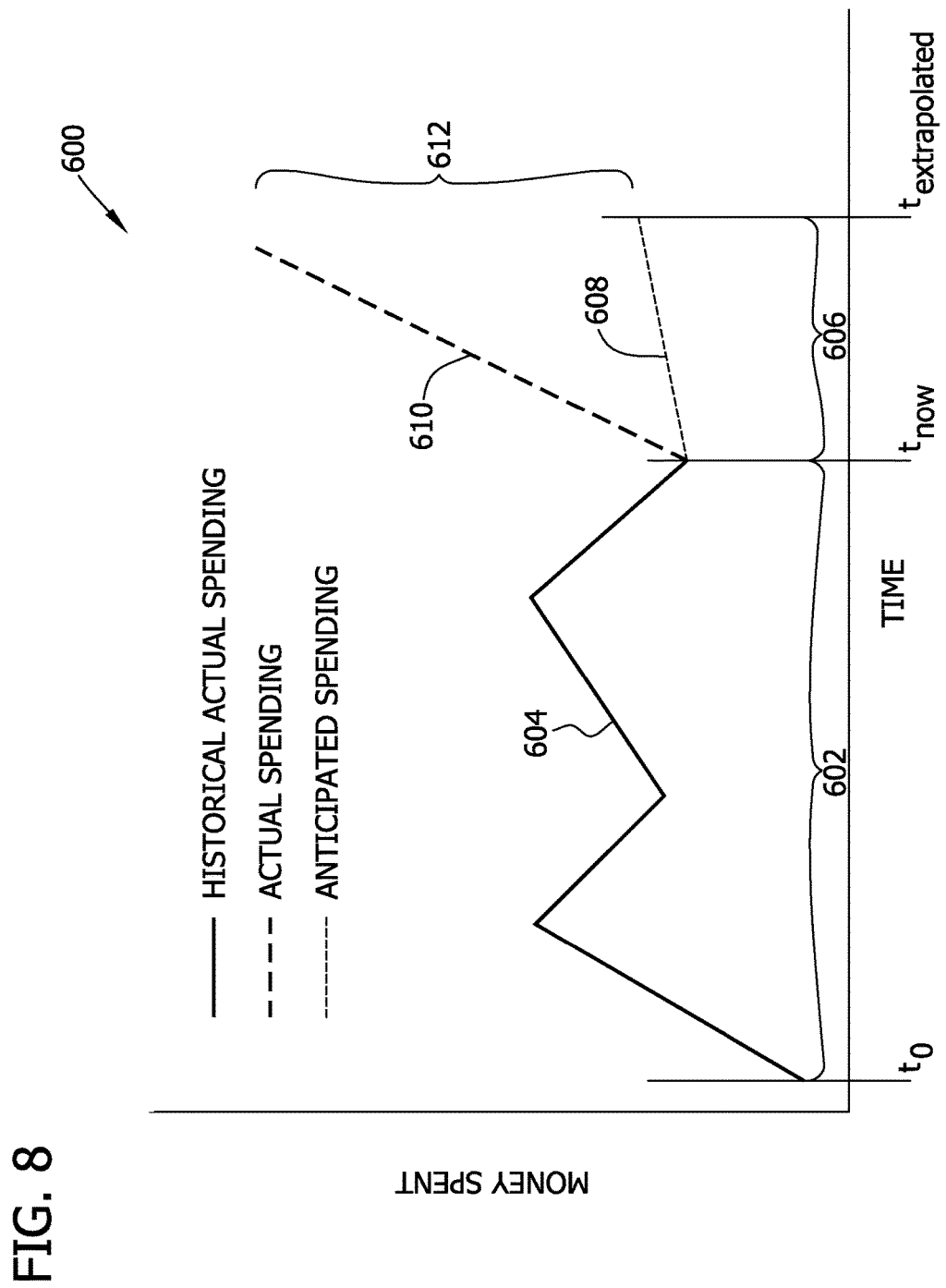
FIG. 8 is a graph of historical actual spending, anticipated actual spending, and actual spending for a consumer in a consumption bundle that may be used with the method shown in FIG. 7.

FIG. 7 is a flowchart illustrating an exemplary method 500 for determining 206 a sample group of consumers that may be used with method 200 (shown in FIG. 4). FIG. 8 is a graph 600 of historical spending, anticipated spending, and actual spending for a consumer in terms of money spent with respect to time. Money spent may be in any suitable currency, such as U.S. dollars, and time may be in any suitable measurement of time, such as days. Graph 600 shows a sum of spending in all spending variables assigned to a consumption bundle of a life event. Alternatively, spending in each spending variable of the consumption bundle may be graphed separately.

Method 500 includes, for a consumer of the global population, analyzing 502 actual spending during a historical time period 602 in each spending variable of the consumption bundle for the life event. More specifically, in one embodiment, the global population is defined as including consumers having accounts with multiple transactions per month across multiple industries and that have been active for at least a year. In a particular embodiment, the global population includes consumers that have an account that is active in the current month, that has been open for thirteen or more months, and that averages five or more transactions per month since opening the account. Further, in one embodiment, each consumer's spending for the past three years in each spending variable is analyzed 502. In the exemplary embodiment, the actual spending for the whole consumption bundle for the life event is summed 504 for each day of the historical time period 602 and plotted 506 with respect to time. Such a plot is shown in FIG. 8 as historical actual spending curve 604.

From the historical actual spending curve 604, anticipated spending for a predetermined time period 606 into the future, or an extrapolation time period 606, is determined for each consumer of the global population by extrapolating 508 from the historical actual spending for a respective consumer. More specifically, the historical actual spending curve 604 is extrapolated 508 to generate an anticipated spending curve 608. In one embodiment, historical actual spending curve 604 is extrapolated one month to three months into the future to generate anticipated spending curve 608. In the exemplary embodiment, anticipated spending curve 608 represents anticipated spending in all spending variables assigned to the consumption bundle of the life event.

The consumer's actual spending during the extrapolation time period 606 is determined 510. More specifically, based on recorded transaction data, the consumer's spending in the spending variables of the consumption bundle are summed for each day during the extrapolation time period 606 and are plotted on graph 600 as an actual spending curve 610. In the exemplary embodiment, each consumer of the global population will have a respective graph 600 showing each consumer's historical actual spending, anticipated spending, and actual spending. Further, in the exemplary embodiment, after the extrapolation time period 606 expires, steps 504-510 are repeated for a subsequent extrapolation time period. As such, each consumer of the global population is continuously being monitored for an occurrence of the life event. In one example, consumers are re-evaluated every month to determine if a consumer is experiencing the life event.

After historical actual spending curve 604, anticipated spending curve 608, and actual spending curve 610 are determined 506, 508, and 510 for each consumer of the global population, each consumer's actual spending curve 610 is compared 512 his/her anticipated spending curve 608 for the extrapolated time period 606 to determine 514 a variance 612 between actual spending and anticipated spending. In one embodiment, the variance 612 is determined 514 by comparing 512 an average daily anticipated spend with an average daily actual spend. In an alternative embodiment, the variance 612 is determined 514 by comparing 512 by total anticipated spending with total actual spending during the extrapolated time period 606. In still another embodiment, any suitable statistic method and/or technique is used to determine 514 the variance 612 between anticipated spending curve 608 and actual spending curve 610. In one example, a consumer who has never had a child and has never purchased baby products or maternity clothes will have fairly low anticipated spending in the new baby purchase bundle while someone who is the mother of five young children will likely have higher anticipated spending in the new baby purchase bundle. As such, by comparing each consumer to his/her own historical actual spending, consumers experiencing the life can be determined.

One example of comparing 512 anticipated spending to actual spending is to use residual analysis. Residual analysis, as referred to herein, is the identification of significant differences, beyond some threshold, between anticipated and actual spending behavior. If a consumer's, or an account holder's, actual spending in a given consumption bundle deviates significantly from anticipated spending in that consumption bundle, then it is assumed that the consumer is experiencing the relevant life event. More specifically, in residual analysis a normalized residual R(t) is defined as the difference in actual spending S(t) and anticipated spending P(t), divided by the anticipated spending P(t) in month t.

$$R(t) = \frac{S(t) - P(t)}{P(t)}, \qquad \text{(Eq. 1)}$$

The onset of an event is indicated the first time a calculated residual R(t) surpasses, or falls below, a predetermined threshold c. For example, given c=10 the onset of an event occurs when R(t) is greater than 10. The results of the residual analysis include the determined variance 612 between the anticipated spending curve 608 and the actual spending curve 610 of the consumer in the spending variables of the consumption bundle.

As such, in one embodiment of the systems and methods described herein, the normal spending habits of a transaction card user are tracked to determine if the consumer is experiencing the life event. These normal spending habits, such as how much a person spends and/or how often the person spends, are based on historical use of the card to make purchases. A determination of experiencing the life event is made when deviations in spending occur. Such deviations, as indicated by the variance 612, can include, without limitation, increases in spending amount, decreases in spending amount, increases in spending frequency, and/or decreases in spending frequency. Further, such deviations indicate a change in consumer needs and/or behavior, including possibly predicting future needs or behavior. Accordingly, in one embodiment, when deviations occur as indicated by the variance 612, it is assumed that something out of the ordinary has occurred for a particular consumer. The meaning of one or more deviations can then be determined, for example, based on additional data, such as, without limitation, merchants shopped and/or direct consumer surveys.

In the exemplary embodiment, when the variance 612 is below a predetermined threshold and/or within predetermined criteria, the consumer continues to be monitored for the occurrence of the life event by repeating steps 502-514. When the variance 612 is above the predetermined threshold and/or not within predetermined criteria, it is determined 516 that the consumer is experiencing the life event. Optionally, when demographic variables have been assigned 406 (shown in FIG. 6) to the life event, the consumer's demographic data is also analyzed 518 to determine if the consumer is experiencing the life event.

Consumers who are determined 516 and/or 518 to be experiencing the life event are assigned 520 to a sample group. As such, the sample group includes consumers who, based on a respective variance 612, are experiencing or have recently experienced the life event. Based on continued monitoring of each consumer's anticipated spending and actual spending, consumers are added to or removed from the sample group. In the exemplary embodiment, only consumers who have had a variance 612 in the consumption bundle exceeding a predetermined threshold for a predetermined time period are assigned 520 to the sample group. In one example, consumers having a variance 612 in the consumption bundle for the life event for two consecutive months wherein the variance 612 indicates actual spending that is at least three times the anticipated spending are assigned 520 to the sample group.

Figure 9:
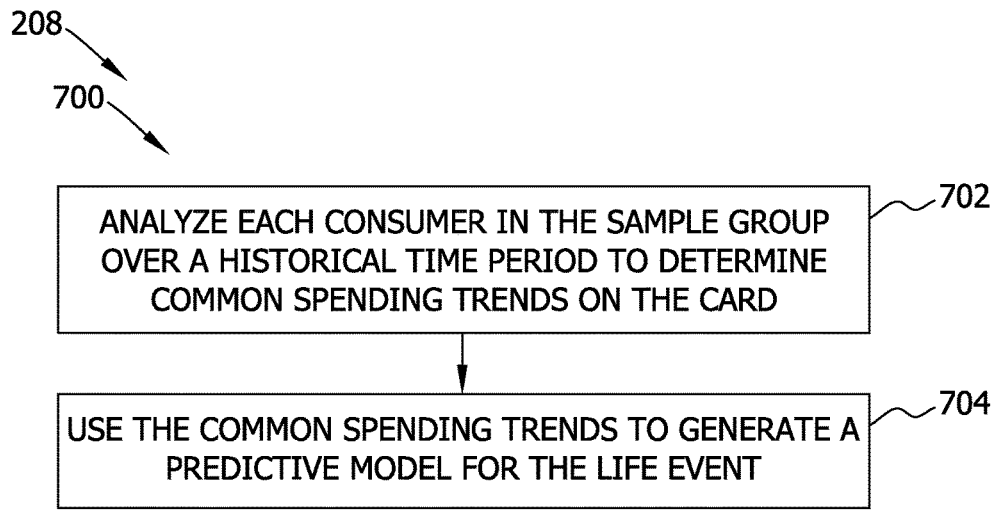
FIG. 9 is a flowchart illustrating an exemplary method for generating a predictive model that may be used with the method shown in FIG. 4.

FIG. 9 is a flowchart illustrating an exemplary method 700 for generating 208 a predictive model that may be used with method 200 (shown in FIG. 4). Method 700 includes analyzing 702 each consumer in the sample group to determine spending trends that are common among the consumers in the sample group. More specifically, card purchases for each consumer over a historical time period are analyzed 702 for spending trends. In one embodiment, each consumer's card purchases for the last three months to one year are analyzed 702 to determine spending trends for each consumer. In the exemplary embodiment, mathematical techniques are used to analyze over six-hundred variables and to identify the changes in spending behavior, or spending trends, that are most predictive of the life event. More specifically, the spending trends for each consumer are compared to the spending trends of other consumers within the sample group, as described in more detail below. When a predetermined percentage and/or other threshold of consumers within the sample group have the same spending trend, the spending trend is considered to be a common spending trend.

Using the common spending trends, a predictive model is generated 704. In the exemplary embodiment, the predictive model uses a logistic technique in which scores for missing targets rank similarly to detected targets. Further, in the exemplary embodiment, the predictive model includes the common spending trends such that consumers having similar spending trends can be predicted to experience the life event. As such, the predictive model is a set of spending trends and logic.

Figure 10:
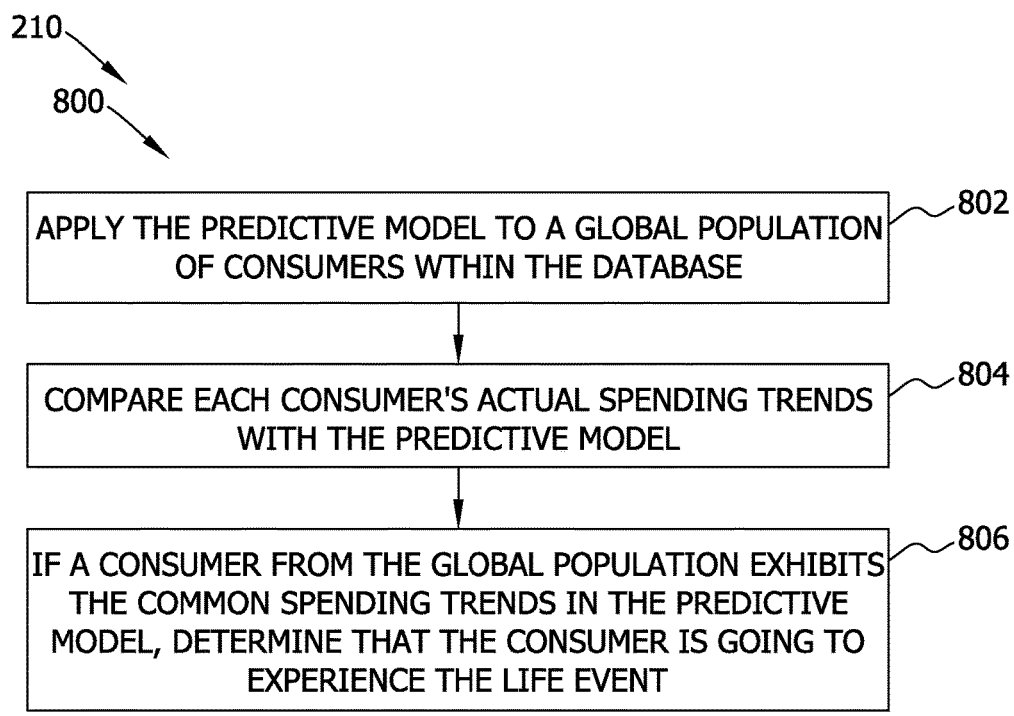
FIG. 10 is a flowchart illustrating an exemplary method for predicting whether a consumer will experience a life event that may be used with the method shown in FIG. 4.

FIG. 10 is a flowchart illustrating an exemplary method 800 for predicting 210 whether a consumer will experience a life event that may be used with method 200 (shown in FIG. 4). Method 800 includes applying 802 the predictive model to each consumer having an account on the interchange network 28 (shown in FIG. 1) to determine if a consumer is going to experience the life event. More specifically, by comparing 804 spending trends within the predictive model to consumers' actual spending trends over a historical time period, the occurrence of the life event for a consumer can be determined 806 before a variance 612 (shown in FIG. 8) in the consumer's actual spending and anticipated spending occurs.

In the exemplary embodiment, the numeric captured transaction card information that has been recorded 202 (shown in FIG. 4) is processed to determine if any changes in purchasing behavior are predicted for each consumer having a card account. More specifically, the system 100 and/or 122 (shown in FIGS. 2 and 3) captures and records 202 information on customer spending using a card, and the predictive model uses the recorded data to identify signals that suggest a change in need and/or behavior of a consumer before the change occurs. In one embodiment available purchasing data is analyzed such that changes in consumer needs are anticipated and changes in consumer needs and/or behaviors are predicted. As such, past spending behavior may be used to predict future spending behaviors, preferences, and/or needs. Further, the past spending behavior may be used to identify products and/or services that may be best suited for specific consumers.

Referring to FIG. 4, examples of method 200 are described below.

Child to College Example

In this example, the predictive model is configured to predict which account holders are most likely to send a child to college in the coming months. For example, consumer purchasing data is used to identify a family whose children are about to leave for college. In the exemplary embodiment, the sample group is determined by using a consumption bundle including the following spending variables: purchases in the university category, purchases at merchants on college campuses, spending occurring in August and/or September, spending is less than 50% of total card spending for a month, purchases of college prep courses, and purchase made in college towns.

Spending trends exhibited by consumers in the sample group for inclusion in the predictive model include: increases in consumer electronics purchases, family apparel purchases, book store purchases, airline purchases, sporting good purchases, and/or software and network service purchases. Consumers within the global population exhibiting similar spending trends, whether or not a variance in the consumption bundle has occurred, are predicted to send a child to college in the near future, such as the next three months to one year.

Based on the determination that a family has at least one child who is about to leave for college, the system 100 and/or 122 (shown in FIGS. 2 and 3) may recommend products or services aimed at "empty nesters" and young students. It is likely that the needs of the parents and children will soon be changing and the predictive model is configured to predict these changes before the change actually happens. As such, valuable products or services can be offered in anticipation of these changes. Further, feedback into the predictive model based on which promotions or coupons are used by the consumer is used to refine the model. For example, if families sending children to college tend to accept offers for student cards but reject "empty nester" cards, it may make sense to continue providing the former and discontinue offering the latter.

By adding the optional demographic variables to the consumption bundle, the predictive model may be able to distinguish between first or last child leaving for college, and/or between grandchild or child leaving for college. In one embodiment, the "child to college" predictive model is 4.3 times more likely to predict a child leaving for college than other known marketing models, and has a lead time of about six months for the prediction.

New Baby Example

In this example, the predictive model is configured to predict which account holders are most likely to have a new baby in the coming months. In the exemplary embodiment, the sample group is determined by using a consumption bundle including the following spending variables: specialty merchants selling maternity wear, merchants selling baby products, specialty children's merchants, and spending variance lasts for at least two consecutive months.

Spending trends exhibited by consumers in the sample group for inclusion in the predictive model include: increases in children's apparel purchases, toy store purchases, overall card spending and number of purchases, and family apparel purchases, and a decrease in restaurant purchases. Consumers within the global population exhibiting similar spending trends, whether or not a variance in the consumption bundle has occurred, are predicted to have a new baby in the near future, such as the next three months to one year.

By adding the optional demographic variables to the consumption bundle, the predictive model may be able to distinguish between first or subsequent child, and/or between grandchild or child. In one embodiment, the "new baby" predictive model is 4.2 times more likely to predict a consumer having a new baby than other known marketing models, and has a lead time of about three or more months for the prediction.

New Home Example

In this example, the predictive model is configured to predict which account holders are most likely to change their residential zip code in the coming months. In the exemplary embodiment, the sample group is determined by using a consumption bundle including the following spending variables: change in residential zip code (measured using bundle of everyday spend merchant categories), five or more months of stable spending in one zip code followed by five or more months of stable spending in another zip code.

Spending trends exhibited by consumers in the sample group for inclusion in the predictive model include: increases in restaurant purchases, a number of public administration transactions, a number of telecommunication transactions, a number of legal and accounting service transactions, and a number of jewelry and giftware transactions, and a decrease in a number of grocery transactions. Consumers within the global population exhibiting similar spending trends, whether or not a variance in the consumption bundle has occurred, are predicted to purchase a new home in the near future, such as the next three months to one year.

In the exemplary embodiment, card transaction data is used to identify a young couple about to purchase a home. By using the couple's transaction data, the predictive model can predict that there is a 60% chance the couple will purchase a house in the next twelve months. The predictive model may suggest that the couple be offered a transaction card product best suited for new home owners (for example, a card that provides discounts or cash back at home furnishings and home improvement stores). Uptake of offers can be monitored and used to refine the model.

In one embodiment, the "new home" predictive model is 2.3 times more likely to predict a purchase of a new home than other known marketing models, and has a lead time of about three months for the prediction.

Other examples of predictive models include: a model targeted at top of wallet cardholders having thirteen months of consecutive spending with an average of five or more transaction per month, a model that can accurately predict a cardholder's overall spending for next month and/or next quarter to identify emerging affluent, a model that can accurately predict cardholder spending by merchant category for the next month and/or the next quarter to target for commerce coalition, and a model that predicts cardholder inactivity next month and/or next quarter to identify "at risk" cardholders for retention efforts.

The above-described methods and systems facilitate proactively refreshing value propositions offered to consumers to increase card relevance and reduce attrition. As such, card holders will receive less irrelevant offers and more relevant offers, which benefits both the cardholders and the offerors. The predictive models described herein provide valuable information to issuers and merchants to help them cross-sell to consumers. Issuers and/or merchant may gain a competitive advantage over competitors because the embodiments described herein enable issuers and/or merchants to reach consumers before they experience the life event and, accordingly, before the competition has the chance to market to these consumers.

According to some embodiments of the systems and methods described herein, consumer needs and/or behaviors are predicted based on historical, anticipated, and actual customer spending using transaction cards. Transactions using the cards may provide a large amount of data about consumer spending. Further, spending data from cards may, in some cases, be more readily available than demographic data, which may be incomplete, inaccurate, and/or infrequently updated. In the embodiments described herein, transaction data is used to predict which consumers will experience a life event and how consumer spending behavior may change when the life event is experienced. Further, modeling and/or analytical algorithms are used in the above-described embodiments to identify trends and make recommendations. For example, when transaction date and amount data predicts that a change has occurred, or will occur, additional data, such as merchant name, type, demographic data, and/or any other suitable data, can be used to predict what type of change has occurred. As more predictions are made by the predictive model, it may be possible to predict what change in customer need has occurred based on, for example, transaction date and amount without additional transaction or demographic data.

Exemplary embodiments of methods and systems for predicting consumer behavior from transaction card purchases are described above in detail. The methods and systems are not limited to the specific embodiments described herein, but rather, components of the systems and/or steps of the methods may be utilized independently and separately from other components and/or steps described herein. For example, the methods may also be used in combination with other targeting systems and methods, and are not limited to practice with only the targeting systems and methods based on transaction card purchases as described herein. Rather, the exemplary embodiment can be implemented and utilized in connection with many other target marketing applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-based method for predicting consumer behavior within a predetermined time period, said method performed using a payment processor computer device coupled to a database, said method comprising:

recording, by the payment processor computer device, electronic consumer data in the database for each consumer of a global population of consumers including historical purchases made by each consumer, including at least one electronic transaction initiated by a consumer using a transaction card at a point-of-sale (POS) device;

defining, by the payment processor computer device, a life event by assigning spending variables to the life event, wherein a spending variable represents a quantity of consumer spending associated with one or more of (i) a particular merchant and (ii) a particular type of good or service;

generating an anticipated spend for each spending variable assigned to the life event by extrapolating a historical actual spend based on the historical purchases, wherein the anticipated spend represents anticipated spending in each spending variable assigned to the life event;

calculating a residual value of a determined variance between the anticipated spend and an actual spend for each consumer by calculating a quotient of (i) the difference between the anticipated spend and the actual spend and (ii) the anticipated spend;

determining that a residual value of a determined variance between the anticipated spend and the actual spend for each consumer exceeds a predefined threshold;

assigning, by the payment processor computer device, the consumer to a sample group, wherein the sample group represents consumers that are experiencing the life event;

generating, by the payment processor computer device, a predictive model based on historical purchases made by consumers within the sample group;

applying, by the payment processor computer device, the predictive model to predict each consumer within the global population and outside of the sample group that will experience the life event; and outputting, by the payment processor computer device, a list of consumers outside of the sample group that are predicted to experience the life event within the predetermined time period.

2. A computer-based method in accordance with claim 1 wherein performing residual analysis further comprises:

analyzing historical purchases for each consumer within the global population having an account in the database during a historical time period for each spending variable in a consumption bundle of the life event;

determining a historical actual spending curve for each consumer within the global population during the historical time period using the historical purchases made in the consumption bundle;

determining an anticipated spending curve for each consumer within the global population during a second time period after the historical time period using the historical actual spending curve, wherein the anticipated spending curve is determined before the second time period occurs;

collecting purchase data for each consumer within the global population over the second time period; and determining an actual spending curve during the second time period for each consumer within the global population using the collected purchase data, wherein the actual spending curve is determined after the second time period occurs.

3. A computer-based method in accordance with claim 2 wherein performing residual analysis further comprises:

comparing the actual spending curve and the anticipated spending curve for each consumer within the global population during the second time period;

determining a variance between the actual spending curve and the anticipated spending curve for each consumer within the global population; and assigning consumers within the global population to the sample group using the residual value of the determined variance.

4. A computer-based method in accordance with claim 1 further comprising:

causing a customized offer to be sent to the at least one consumer on the output list for a product related to a life event being experienced by the at least one consumer, based on a the spending variable assigned to the life event.

5. A computer-based method in accordance with claim 1 further comprising refining the predictive model using actual spending by at least one consumer on the output list of consumers based on purchases made on a transaction card.

6. A computer-based method in accordance with claim 1 wherein recording consumer data in the database for each consumer of a global population further comprises:

recording transaction card purchase data for each consumer within the global population to the database; and recording third party data about each consumer within the global population to the database.

7. A computer-based method in accordance with claim 1 wherein defining a life event by assigning spending variables to the life event further comprises:

selecting a life event a consumer may experience; and assigning at least one spending variable to the selected life event to form a consumption bundle for the selected life event.

8. A computer-based method in accordance with claim 7 wherein defining a life event by assigning spending variables to the life event further comprises assigning at least one demographic variable to the life event, the consumption bundle comprising the at least one assigned demographic variable and the at least one assigned spending variable.

9. A computer-based method in accordance with claim 1 wherein generating a predictive model based on historical purchases made by consumers within the sample group further comprises:

analyzing each consumer in the sample group during a historical time period to determine spending trends that are common to consumers within the sample group based on the historical purchases, wherein a spending trend represents at least one of an increase, a decrease or no change in the amount of spending in a spending variable; and generating a predictive model that includes the determined spending trends.

10. A computer-based method in accordance with claim 1 wherein applying the predictive model to predict each consumer within the global population that will experience the life event further comprises:

applying the predictive model to all consumers within the global population having an account in the database;

modeling actual spending trends of each consumer within the global population using the predictive model, the predictive model including a set of spending trends; and when the actual spending trends of a consumer within the global population are similar to the set of spending trends included within the predictive model, predicting that the consumer will experience the life event.

11. A computer-based method in accordance with claim 1 wherein defining a life event further comprises defining the life event as one of having a new baby, sending a child to college, and purchasing a new home.

12. A computer for predicting behavior of a consumer within a predetermined time period based on the consumer's purchases made using a transaction card, said computer comprising a processor, computer-readable instructions executable by the processor, and a database, said computer configured to:
   record electronic consumer data in said database for each consumer of a global population of consumers including historical purchases made by each consumer, including at least one electronic transaction initiated by a consumer using a transaction card at a point-of-sale (POS) device;
   define a life event by assigning spending variables to the life event, wherein a spending variable represents a quantity of consumer spending associated with one or more of (i) a particular merchant and (ii) a particular type of good or service;
   generate an anticipated spend by extrapolating a historical actual spend based on the historical purchases, wherein the anticipated spend represents anticipated spending in each spending variable assigned to the life event;
   calculate a residual value of a determined variance between the anticipated spend and an actual spend for each consumer by calculating a quotient of (i) the difference between the anticipated spend and the actual spend and (ii) the anticipated spend;
   determine that a residual value of a determined variance between the anticipated spend and the actual spend for each consumer exceeds a predefined threshold;
   assign the consumer to a sample group, wherein the sample group represents consumers that are experiencing the life event;
   generate a predictive model based on historical purchases made by consumers within the sample group, wherein the predictive model is generated using the processor;
   apply the predictive model to predict each consumer within the global population and outside of the sample group that will experience the life event; and
   output a list of consumers outside of the sample group that are predicted to experience the life event within the predetermined time period.

13. A computer in accordance with claim 12 further configured to:
   analyze historical purchases of a consumer within the global population having an account in said database during a historical time period for each spending variable in a consumption bundle of the life event;
   determine a historical actual spending curve during the historical time period for the consumer using the historical purchases made in the consumption bundle;
   determine an anticipated spending curve during a second time period after the historical time period for the consumer using the historical actual spending curve, wherein the anticipated spending curve is determined before the second time period occurs;
   collect purchase data for the consumer over the second time period;
   determine an actual spending curve during the second time period for the consumer using the collected purchase data, wherein the actual spending curve is determined after the second time period occurs;
   compare the actual spending curve and the anticipated spending curve for the consumer during the second time period;
   determine a variance between the actual spending curve and the anticipated spending curve; and
   assign the consumer to the sample group using the residual value of the determined variance.

14. A computer in accordance with claim 12 further configured to:
   map anticipated consumer needs to at least one offer stored within the database based on the defined life event; and
   provide the least one offer to the consumer.

15. A computer in accordance with claim 12 further configured to refine the predictive model using actual spending of the consumers within the sample group based on purchases made on transaction cards by at least one of adding a spending variable to the definition of the life event and removing a spending variable from the definition of the life event.

16. A computer in accordance with claim 12 further configured to:
   select a life event a consumer may experience; and
   assign at least one spending variable to the selected life event to form a consumption bundle for the selected life event.

17. A computer in accordance with claim 12 further configured to:
   analyze each consumer in the sample group during a historical time period to determine spending trends that are common to consumers within the sample group based on the recorded consumer data, wherein a spending trend represents at least one of an increase, a decrease or no change in the amount of spending in a spending variable; and
   generate a predictive model that includes the determined spending trends.

18. A computer in accordance with claim 17 further configured to:
   apply the predictive model to each consumer within the global population;
   model actual spending trends of each consumer within the global population with the predictive model; and
   when actual spending trends of a consumer within the global population are similar to spending trends within the predictive model, predict that the consumer will experience the life event.

19. A network based system for predicting behavior of a consumer within a predetermined time period based on the consumer's purchases made using a transaction card, said system comprising:
   a client computing device;
   a database for storing information; and
   a server computing device comprising a processor and computer-readable instructions executable by said processor, said server computing device configured to be coupled to said client computing device and said database, said server computing system further configured to:
      record electronic consumer data in said centralized database for each consumer of a global population of consumers including historical purchases made by each consumer, including at least one electronic transaction initiated by a consumer using a transaction card at a point-of-sale (POS) device;
      define a life event by assigning spending variables to the life event, wherein a spending variable represents a quantity of consumer spending associated with one or more of (i) a particular merchant and (ii) a particular type of good or service;

generate an anticipated spend by extrapolating a historical actual spend based on the historical purchases, wherein the anticipated spend represents anticipated spending in each spending variable assigned to the life event;

calculate a residual value of a determined variance between the anticipated spend and an actual spend for each consumer by calculating a quotient of (i) the difference between the anticipated spend and the actual spend and (ii) the anticipated spend;

determine that a residual value of a determined variance between the anticipated spend and the actual spend for each consumer exceeds a predefined threshold;

assign the consumer to a sample group, wherein the sample group represents consumers that are experiencing the life event;

generate a predictive model based on historical purchases made by consumers within the sample group;

apply the predictive model to predict each consumer within the global population and outside of the sample group that will experience the life event; and output a list of consumers outside of the sample group that are predicted to experience the life event within the predetermined time period.

20. A network based system in accordance with claim 19, wherein said server computing device is further configured to:

analyze historical purchases of a consumer within the global population having an account in said database during a historical time period for each spending variable in a consumption bundle of the life event;

determine a historical actual spending curve during the historical time period for the consumer using the historical purchases made in the consumption bundle;

determine an anticipated spending curve during a second time period after the historical time period for the consumer using the historical actual spending curve, wherein the anticipated spending curve is determined before the second time period occurs;

collect purchase data for the consumer over the second time period;

determine an actual spending curve during the second time period for the consumer using the collected purchase data, wherein the actual spending curve is determined after the second time period occurs;

compare the actual spending curve and the anticipated spending curve for the consumer during the second time period;

determine a variance between the actual spending curve and the anticipated spending curve; and assign the consumer to the sample group using the residual value of the determined variance.

21. A network based system in accordance with claim 19, wherein said server computing device is further configured to:

analyze each consumer in the sample group during a historical time period to determine spending trends that are common to consumers within the sample group, wherein a spending trend represents at least one of an increase, a decrease or no change in the amount of spending in a spending variable;

generate a predictive model that includes the determined spending trends;

apply the predictive model to each consumer within the global population;

model actual spending trends of each consumer within the global population with the spending trends included within the predictive model; and when actual spending trends of a consumer within the global population are similar to spending trends within the predictive model, predict that the consumer will experience the life event.

22. A computer program embodied on a non-transitory computer readable storage medium for predicting consumer behavior, said program comprising at least one code segment that, when executed by a computing device including at least one processor in communication with a memory, causes the computing device to:

record electronic consumer data in the database for each consumer of a global population of consumers including historical purchases made by each consumer, including at least one electronic transaction initiated by a consumer using a transaction card at a point-of-sale (POS) device;

define a life event by assigning spending variables to the life event, wherein a spending variable represents a quantity of consumer spending associated with one or more of (i) a particular merchant and (ii) a particular type of good or service;

generate an anticipated spend by extrapolating a historical actual spend based on the historical purchases, wherein the anticipated spend represents anticipated spending in each spending variable assigned to the life event;

calculate a residual value of a determined variance between the anticipated spend and an actual spend for each consumer by calculating a quotient of (i) the difference between the anticipated spend and the actual spend and (ii) the anticipated spend;

determine that a residual value of a determined variance between the anticipated spend and the actual spend for each consumer exceeds a predefined threshold;

assign the consumer to a sample group, wherein the sample group represents consumers that are experiencing the life event;

generate a predictive model based on historical purchases made by consumers within the sample group;

apply the predictive model to predict each consumer within the global population and outside of the sample group that will experience the life event; and output a list of consumers outside of the sample group that are predicted to experience the life event within the predetermined time period.

\* \* \* \* \*

UNITED STATES PATENT AND TRADEMARK OFFICE
CERTIFICATE OF CORRECTION

PATENT NO. : 10,430,803 B2  
APPLICATION NO. : 12/342925  
DATED : October 1, 2019  
INVENTOR(S) : Marc Del Bene et al.

Page 1 of 1

It is certified that error appears in the above-identified patent and that said Letters Patent is hereby corrected as shown below:

In the Claims

Claim 4, Column 20, Line 6, delete "based on a the spending variable" and insert therefor -- based on the spending variable --.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*